United States Patent
Cook

(10) Patent No.: US 8,176,532 B1
(45) Date of Patent: May 8, 2012

(54) SECURE ACCESS POINT FOR SCADA DEVICES

(75) Inventor: Fred S. Cook, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 3099 days.

(21) Appl. No.: 10/390,134

(22) Filed: Mar. 17, 2003

(51) Int. Cl.
*H04L 29/06* (2006.01)

(52) U.S. Cl. .................. 726/4; 726/11; 726/12; 726/13; 726/14

(58) Field of Classification Search .......................... None
See application file for complete search history.

(56) References Cited

U.S. PATENT DOCUMENTS

| | | | |
|---|---|---|---|
| 5,452,465 | A | 9/1995 | Geller et al. |
| 6,005,759 | A | 12/1999 | Hart et al. |
| 6,321,272 | B1 | 11/2001 | Swales |
| 6,400,707 | B1 * | 6/2002 | Baum et al. .................. 370/352 |
| 6,477,166 | B1 | 11/2002 | Sanzi et al. |
| 6,484,061 | B2 | 11/2002 | Papadopoulos et al. |
| 6,751,562 | B1 * | 6/2004 | Blackett et al. ................. 702/61 |
| 2001/0033574 | A1 | 10/2001 | Enoki et al. |
| 2001/0049739 | A1 | 12/2001 | Wakayama et al. |
| 2002/0122394 | A1 * | 9/2002 | Whitmore et al. ............ 370/328 |
| 2002/0186683 | A1 * | 12/2002 | Buck et al. .................... 370/352 |
| 2003/0233573 | A1 * | 12/2003 | Phinney ........................ 713/200 |
| 2004/0028057 | A1 * | 2/2004 | Benjamin et al. ........ 370/395.52 |

FOREIGN PATENT DOCUMENTS

EP 1187406 3/2002

OTHER PUBLICATIONS

Paul W. Oman, Barriers to a Wide-Area Trusted Network Early Warning System for Electric Power Disturbahces, 2002, IEEE Computer Society, pp. 1-8.*
Paul Oman, Concerns About Intrusions into Remotely Accessible Substation Controllers and Scada Systems, 2000, Schwietzer Engineering Laboratories, pp. 1-16.*

* cited by examiner

*Primary Examiner* — Benjamin Lanier

(57) ABSTRACT

A programmable control unit interacts with a physical system. The physical system has a public network interface for communicating with remote computer systems. A user computer system is located remotely from the programmable control unit. A front-end security gateway is located remotely from the programmable control unit, wherein the front-end security gateway communicates with the user computer system to authenticate and authorize a user for access to the programmable control unit. The front-end security gateway forwards messages between the user computer system and the programmable control unit after the user is authenticated and authorized. A public communication network is coupled between the front-end security gateway and the programmable control unit to carry the forwarded messages. The public communication network includes a routing control configured to allow communication with the programmable control unit only by the front-end security gateway.

11 Claims, 5 Drawing Sheets

SECURE ACCESS POINT FOR SCADA DEVICES

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to remote control of supervisory control and data acquisition (SCADA) devices over a public communication network, and, more specifically, to providing security against unauthorized intrusion to a SCADA-like device.

SCADA devices such as programmable logic controllers (PLCs), remote terminal units (RTUs), intelligent electronic devices (IEDs), energy management system (EMS) devices, and distributed control system (DCS) devices are widely used for controlling various physical systems or plants such as electric power generation and distribution equipment and water treatment and distribution equipment. As used herein, "SCADA device" refers to any such programmable control and/or monitoring unit for interacting with sensors and/or actuators of a physical plant.

SCADA devices have evolved as specialized devices adapted to control or monitor physical systems using hardware and software resources well matched to the desired tasks. To provide a cost effective solution, a typical SCADA device has computing capabilities and memory capacity sufficient to perform its desired monitoring or control function and little else. The devices intentionally lack the flexibility (i.e., programmability) to perform a wide variety of computational and input/output functions and the memory capacity of general purpose computing devices.

In order to provide for remote control and interaction, a remote communication or networking capability has been added to many SCADA devices. For example, a modem for dial-up networking access or a network interface for including in a local area network (LAN) have been used to permit remote adjustment of parameters or other settings in a SCADA device and to remotely retrieve status or data from a SCADA device. Especially in large coordinated systems, such as an electric power grid, it is desirable to reduce management expenses by connecting SCADA devices at remote sites to a wide area network (WAN) so that device settings can be adjusted and status can be monitored from a central location. The network may include a public network such as the Internet.

Whenever remote access is available, the possibility of access by unauthorized people and of the attempted misuse or abuse of the SCADA device or the physical plant are increased. Due to the limited computational capabilities of most SCADA devices, however, it is usually not possible to deploy modern security techniques or software in them.

When remote connection is allowed via a dial-up modem, it may be possible for an unauthorized user to obtain the telephone number used in the public switched telephone network (PSTN) for connecting with the remote SCADA device. Since a SCADA device often lacks even simple security mechanisms such as password protection, the functions and/or information in the SCADA device are unprotected. SCADA devices coupled to the Internet can be especially vulnerable to hackers. The security technologies developed to protect devices on the Internet, such as encryption, security keys, and signatures for obtaining user authentication and authorization, cannot be supported by the SCADA devices.

SUMMARY OF THE INVENTION

The present invention provides the advantage of protecting remote-access enabled primitive SCADA devices from access or attack by unauthorized users even though the SCADA devices lack the ability to support modern security technologies.

In one aspect, the invention provides apparatus for interacting with a physical system comprising a programmable control unit for connecting to the physical system and having a public network interface for communicating with remote computer systems. A user computer system is located remotely from the programmable control unit. A front-end security gateway is located remotely from the programmable control unit, wherein the front-end security gateway communicates with the user computer system to authenticate and authorize a user for access to the programmable control unit. The front-end security gateway forwards messages between the user computer system and the programmable control unit after the user is authenticated and authorized. A public communication network is coupled between the front-end security gateway and the programmable control unit to carry the forwarded messages. The public communication network includes a routing control configured to allow communication with the programmable control unit only by the front-end security gateway.

DETAILED DESCRIPTION OF PREFERRED EMBODIMENTS

Figure 1:
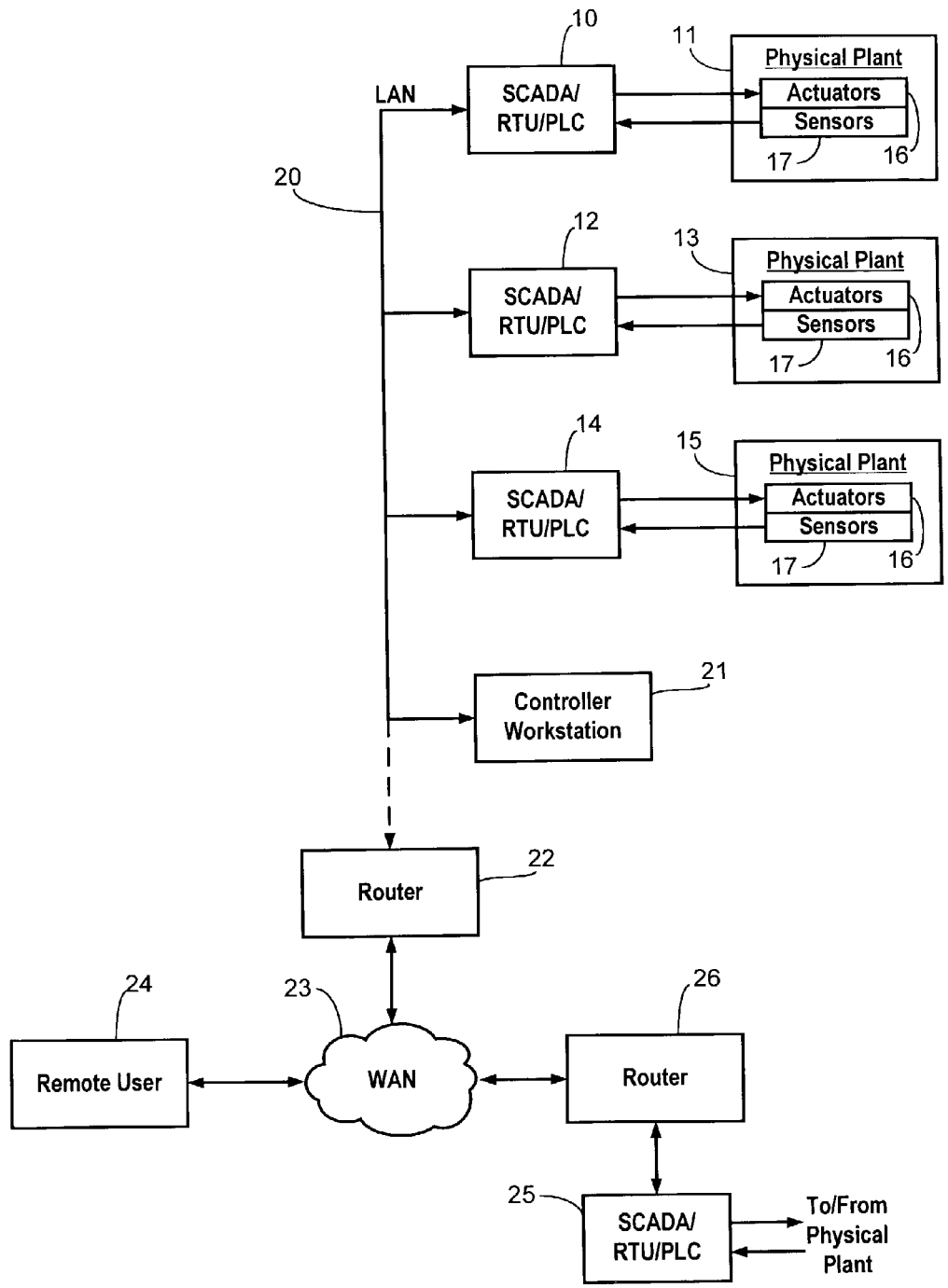
FIG. 1 is a block diagram showing remote network access of SCADA devices.

In one example of a network control architecture shown in FIG. 1, a SCADA device 10 (which can be any of the types of programmable control units listed above such as an RTU or a PLC) is connected to actuators 16 and/or sensors 17 in a physical system or plant 11 for monitoring or controlling operations of plant 11. SCADA device 10 includes a network interface connected to a LAN 20 to permit local administration by a controller workstation 21. Also connected within LAN 20 are SCADA devices 12 and 14 which are connected to actuators 16 and sensors 17 of physical plants 13 and 15, respectively.

In order to provide remote control and/or remote access of data monitored by the SCADA devices, LAN 20 is coupled to a wide area network (WAN) 23 by a router 22. WAN 23 may include a public internetwork such as the Internet. A remote user 24 is coupled to WAN 23 in any suitable manner (e.g., via a router) and can exchange packetized network messages with the SCADA devices using their respective network addresses (e.g., IP addresses). As shown by SCADA device 25 coupled to WAN 23 via a router 26, a SCADA device need not be part of a LAN.

While the SCADA devices of FIG. 1 include sufficient intelligence to perform primitive network communication functions, they typically cannot perform even basic security functions such as encryption or authentication of a user. Therefore, a system of the type shown in FIG. 1 has not been practical for some applications where misappropriation of data or control of the physical plant could be potentially damaging. In many applications, it would be prohibitively expensive to deploy SCADA devices with expanded security functionality. Furthermore, there is already a large installed base of SCADA devices without such functionality but for which it would be desirable to provide secure remote control.

Figure 2:
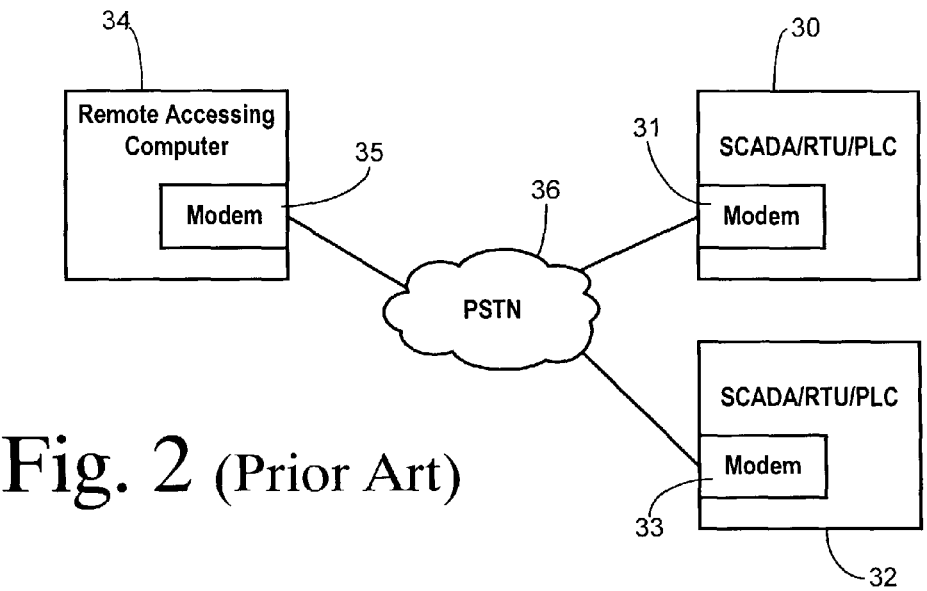
FIG. 2 is a block diagram showing remote dial-up access or SCADA devices.

FIG. 2 shows an alternative remote control system. SCADA devices 30 and 32 include modems 31 and 33, respectively. Likewise, a remote accessing computer 34 includes a modem 35. All the modems are connected to a public switched telephone network (PSTN) 36. An authorized person can initiate a dial-up session with either SCADA device 30 or 32 from remote computer 34 by knowing the telephone number (i.e., ITU-T E.164 address) for the telephone line connected to the respective modem. However, an unauthorized person knowing the telephone number can likewise initiate such a dial-up session.

Figure 3:
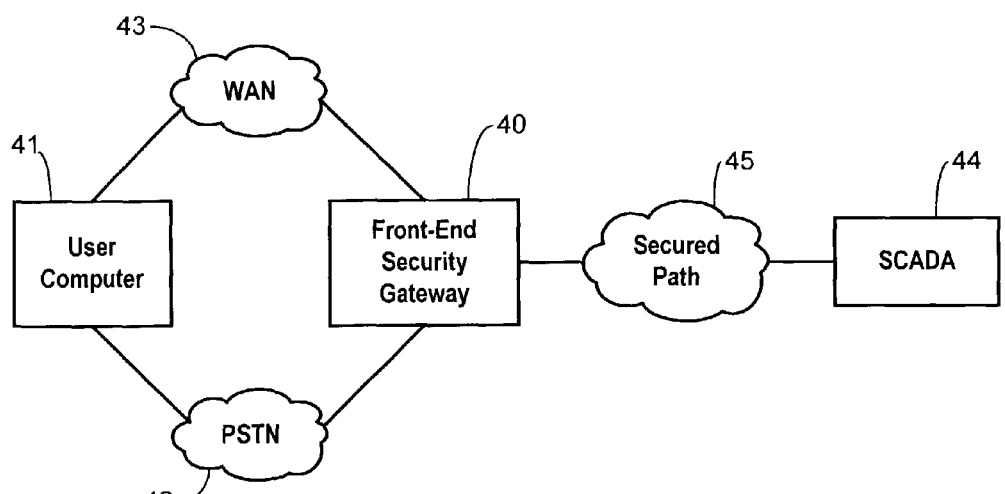
FIG. 3 is a block diagram showing a high level architecture of a gateway security system of the present invention.

A system of the present invention for providing security functions for remote access to a primitive SCADA device is shown in FIG. 3. A front-end security gateway 40 connects on the one hand to a user computer 41 via a public network such as PSTN 42 or WAN 43. Security gateway 40 connects on the other hand to a SCADA device 44 via a secured path 45. Security gateway 40 acts as a proxy (i.e., a trusted front-end processor) for the protected SCADA devices and may be comprised of a general purpose computer device (such as a network server) so that it can implement any selected security mechanisms or applications. Using the security mechanisms, gateway 40 authenticates and authorizes a user for access to SCADA device 44 (which may include predetermined levels of access). After a user is authenticated and authorized to access SCADA device 44, gateway 40 forwards messages (e.g., network packets) between user computer 41 and SCADA device 44 via secured path 45 which ensures that only gateway 40 (or other security gateways) communicates with SCADA device 44. Secured path 45 is contained within a public communication network (e.g., the PSTN or the Internet). The link is preferably protected from access by any other devices in the public network by a routing control mechanism to ensure that only the security gateway(s) can exchange network messages with the SCADA device.

Figure 4:
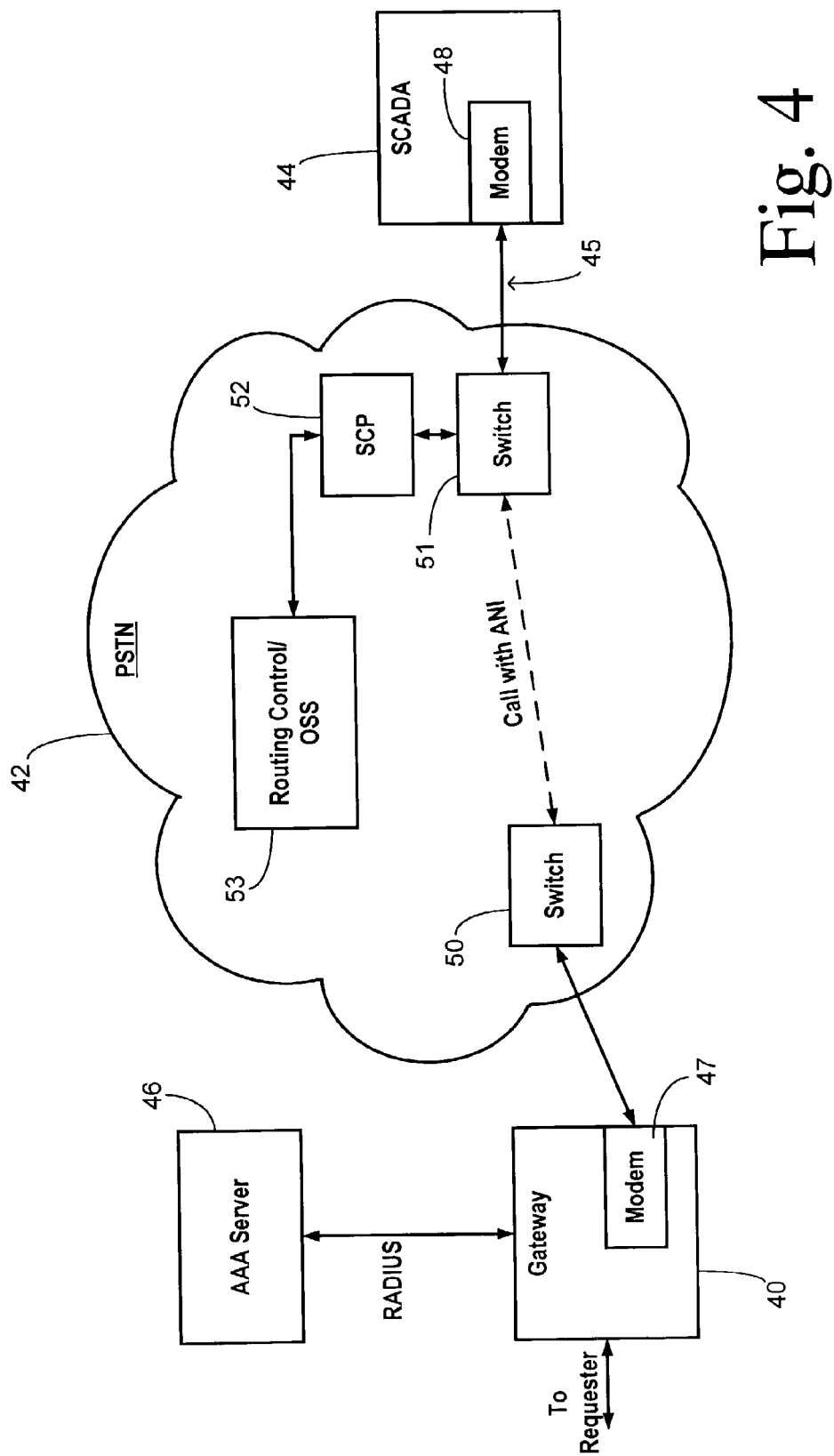
FIG. 4 is a block diagram showing a preferred embodiment of the invention for initiating a dial-up connection to a SCADA device.

FIG. 4 shows an embodiment wherein the secured link is obtained within PSTN 42. In order to authenticate and authorize a requester at a remote computer, front-end security gateway 40 is coupled to an authentication, authorization, and accounting (AAA) server 46. Using the remote authentication dial-in user service (RADIUS) protocol, gateway 40 interacts with AAA server 46 to compare user information (e.g., passwords, certificates, and keys) obtained from the requester with user profiles for authorized users stored in AAA server 46. In addition, gateway 40 preferably uses encryption in its communication with the requester's remote computer (i.e., a public/private encoding key system with a standard mechanism for exchange of public keys).

More specifically, a user contacts gateway 40 and preferably establishes an IPsec tunnel in order to secure the communication between the user's computer and gateway 40. Within the secure tunnel, gateway 40 presents the user with RADIUS requests or another AAA access mechanism that authenticates the user (i.e., establishes identity) and authorizes (i.e., establishes a permission level of the identified user) access to the requested SCADA device. Gateway 40 preferably includes a firewall (such as a stateful firewall) to limit attacks aimed at compromising and/or overwhelming the gateway.

In order to establish a dial-up networking session, gateway 40 includes a modem 47 and SCADA device 44 includes a modem 48. Modem 47 is connected to a phone line which terminates at a switch 50 within PSTN 42. Modem 48 is connected to a phone line which terminates at a switch 51 within PSTN 42. The phone line between modem 48 and switch 51 provides a portion of secure link 45 which is accessible only via gateway 40.

In a preferred embodiment, switch 51 is coupled to a service control point (SCP) 52 which is a component of a standard PSTN network Signaling System 7 (SS7) system that connects to a routing control/operational support system (OSS) 53 for management support functions. As known in the art, an SCP provides call routing functions for implementing enhanced telephone services according to routing tables, routing statements, and routing trees to determine the disposition of calls based on the dialed number, the calling number, other call information, and any treatment codes. These functions may alternatively be included in a switch itself. In either case, the configuration of these functions is accomplished via routing control/OSS 53 which is a private computer network within PSTN 42 for handling FCAPS (fault, configuration, accounting, performance, and security) functions. OSS 53 may typically employ TCP/IP and other protocols for communicating with SCP 52 over private high speed links. In this preferred embodiment, SCP 52 includes set-up information such that an incoming call to the telephone number associated with secured path 45 is only completed when the incoming call is originated from one or more predetermined telephone numbers (which correspond to one or more front-end security gateways). In other words, an originating call restriction is placed on the telephone number of SCADA device 44 such that a call from the telephone number of gateway 40 is completed and otherwise an incoming call is blocked (i.e., not completed). The originating telephone number is identified using automatic number identification (ANI), commonly referred to as caller-ID. The call restriction can provide for a plurality of accepted incoming telephone numbers when there are more than one front-end security gateways which can originate dial-in calls from more than one telephone number.

Figure 5:
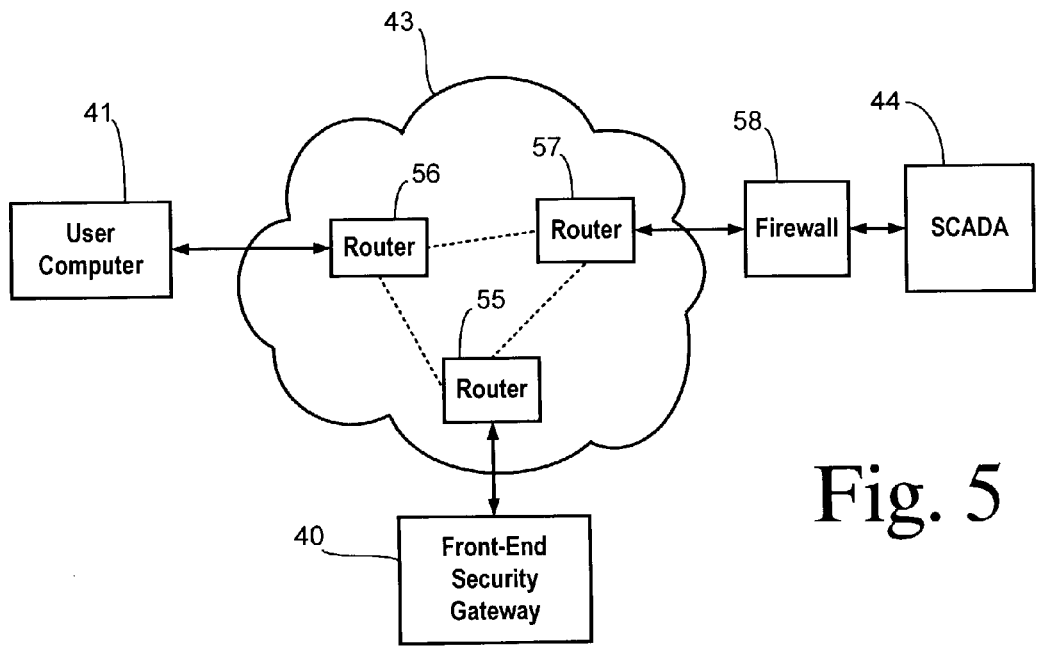
FIG. 5 is a block diagram showing a preferred embodiment of the invention for initiating a public data network connection to a SCADA device.

FIG. 5 shows an alternative embodiment wherein the secured link between gateway 40 and SCADA device 44 includes public data network 43 (e.g., the Internet). Network 43 includes a plurality of routers 55-57 for routing network packets between gateway 40 and user computer 41 and between gateway 40 and SCADA device 44. A conventional firewall 58 (e.g., an address filtering firewall) is connected between SCADA device 44 and router 57. Routing of network packets to SCADA device 44 is based upon a network IP address assigned to SCADA device 44 and appearing in routing tables within at least routers 55 and 57, for example. In order to ensure that only packets relayed by gateway 40 are accepted by SCADA device 44, firewall 58 is configured to pass only network packets having the network IP address of gateway 40 as their origination address, while all other packets are dropped. Preferably, firewall 58 is manually configured in advance to specify the IP address(es) of the security gateway(s).

Figure 6:
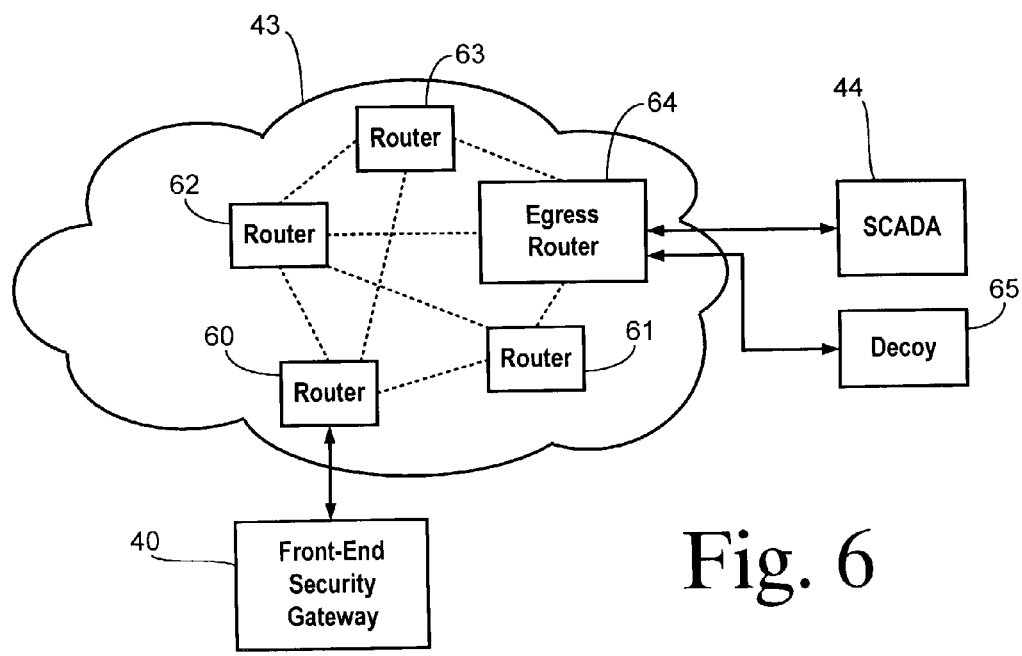
FIG. 6 is a block diagram showing another preferred embodiment of the invention for initiating a public data network connection to a SCADA device.

The addition of a firewall may require deployment of a relatively small and inexpensive hardware device in association with the SCADA device. FIG. 6 shows another alternative embodiment requiring no additional hardware or capabilities deployed with the SCADA device and which instead utilizes a modified egress router to obtain an exclusive, secure link to the SCADA device. Routing of packets from gateway 40 within data network 43 may pass through several routers 60-63 and eventually arrive at an egress router 64 connected to SCADA device 44. This alternative embodiment utilizes label switching in egress router 64 to create a "hidden door" as described in co-pending and commonly assigned U.S. application Ser. No. 10/390,250, entitled "Secure Hidden Route In A Data Network." In this embodiment, egress router 64 includes a predetermined input/output port connection to SCADA device 44 which does not appear in its normal routing tables. Instead, egress router 64 is enabled for label switching and includes a label table referencing the predetermined port. As shown in FIG. 6, the present invention can also set up a decoy device 65 having the same IP address as SCADA device 44 but on a different input/output port of egress router 64 to monitor attempts at unauthorized access to SCADA device 44.

Figure 7:
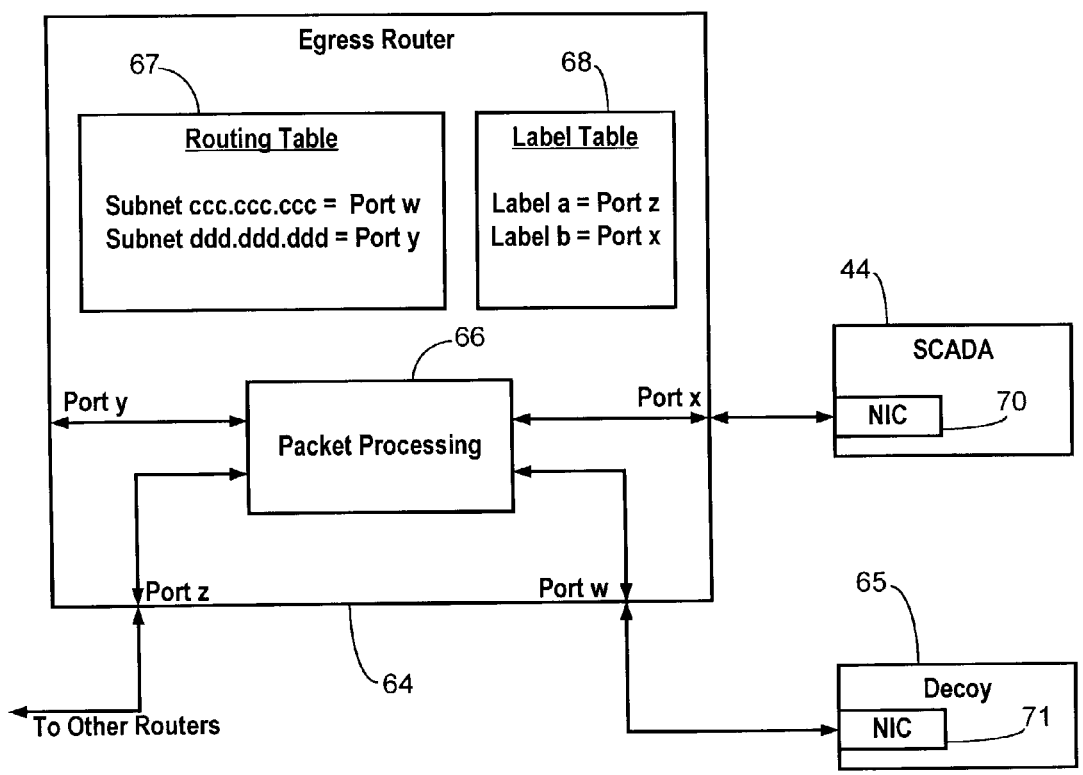
FIG. 7 is a block diagram showing an egress router of FIG. 6 in greater detail.

The egress router embodiment is shown in greater detail in FIG. 7. Egress router 64 includes a packet processor 66 which receives incoming network packets at input/output ports w, x, y, and z. Each packet is inspected as is known in the art and, after consulting either a routing table 67 or a label table 68, is directed to a different one of the input/output ports as appropriate to direct the packet toward its destination. SCADA device 44 includes a network interface 70 which is connected to port x of router 64. The optional decoy device 65 includes a network interface 71 which is connected to port w. In the present embodiment, network interface 70 of SCADA device 44 is configured to be addressable at a first actual IP address (i.e., a full IP address in the form of ccc.ccc.ccc.ccc, such as 65.173.211.241).

When the security gateway sends a network packet destined for SCADA device 44, it labels the packet with a label (e.g., a multi-protocol label switching or MPLS label) that corresponds to an entry in label table 68 of egress router 64 that points to port x. Preferably, the only reference to port x is in label table 68, whereby only a label-switching enabled packet reaching egress router 64 and containing the correct label that points to port x (e.g., label "b" as listed in label table 68) can be forwarded out of port x to SCADA device 44. Any packets forwarded to the first actual IP address using standard routing will not reach SCADA device 44 since normal routing table 67 does not contain any references to port x. Successfully sending a packet to SCADA device 44 requires knowledge of the correct label corresponding to the "hidden port" to which SCADA device 44 is connected. This knowledge is configured into the security gateway so that only it (and any other gateways similarly configured) can send a message that actually reaches the desired SCADA device. In a system including a plurality of SCADA devices to be remotely accessed, it is preferable to use different labels for each SCADA device (whether the devices are on the same or different ports of one egress router or are connected to different egress routers) so that if a label is compromised (e.g.,
becomes known to unauthorized persons) then a security threat results for only one SCADA device.

It is necessary that the labeled packets from the security gateway first reach the egress router. Label switching can be used in the route from the security gateway to the egress router. This must be done in such a way that the label identifying the hidden port at the egress router is preserved for use by the egress router during traversal of the label switched path (i.e., the label cannot be popped at the penultimate router).

If a packet is received by egress router 64 with a destination address equal to the actual IP address of SCADA device 44 but with the label missing, then the packet would have to have originated somewhere other than the security gateway. Such a packet is effectively dropped since standard IP routing tables will not lead to the SCADA destination address. Alternatively, by including an entry of the IP address (or a portion thereof, such as a subnet portion) in routing table 67 that points to another port connected to decoy device 65 which uses the same IP address but in a separate LAN connected to the other port, the unauthorized activity can be detected and monitored. Responses may be made to the unauthorized access attempts including bogus data in order to disguise the decoy, for example.

What is claimed is:

1. Apparatus for interacting with a physical plant comprising:
   a programmable control unit for connecting to said physical plant and for performing a supervisory function for said physical plant, said programmable control unit having a public network interface for communicating with remote computer systems;
   a user computer system located remotely from said programmable control unit;
   a front-end security gateway located remotely from said programmable control unit, wherein said front-end security gateway communicates with said user computer system to authenticate and authorize a user for access to said programmable control unit, and wherein said front-end security gateway forwards messages between said user computer system and said programmable control unit after said user is authenticated and authorized;
   a public communication network coupled between said front-end security gateway and said programmable control unit to carry said forwarded messages, wherein said public communication network comprises a public switched telephone network; and
   a routing control configured to allow communication with said programmable control unit only by said front-end security gateway, wherein said routing control comprises a telephone switching system configured to provide an originating call restriction for a first telephone number at which said programmable control unit interfaces to said public switched telephone network so that telephone calls are accepted from a second telephone number corresponding to an interface of said front-end security gateway to said public switched telephone network and telephone calls from other telephone numbers are blocked.

2. The apparatus of claim 1 wherein said telephone switching system includes a service control point for determining telephone call dispositions in relation to said first telephone number.

3. The apparatus of claim 1 wherein said telephone switching system includes a local office switch for determining telephone call dispositions in relation to said first telephone number.

4. The apparatus of claim 1 wherein said public switched telephone network includes an operational support system for configuring said telephone switching system.

5. The apparatus of claim 1 wherein said programmable control unit is a SCADA device.

6. The apparatus of claim 1 wherein said programmable control unit is a PLC device.

7. A method for a programmable control unit that controls/monitors a physical plant to communicate over a public network with a user computer system, said method comprising the steps of:

establishing a dedicated communication path within said public network between said programmable control unit and a front-end security gateway using routing control for preventing devices other than said front-end security gateway from communicating with said programmable control unit, wherein said public network is comprised of a public switched telephone network;

establishing a protected communication channel between said user computer system and said front-end security gateway;

authenticating and authorizing a user of said user computer system for accessing said programmable control unit; and exchanging messages relating to supervisory functions of said physical plant between said user computer system and said programmable control unit through said front-end security gateway acting as a proxy;

wherein said routing control is comprised of:

configuring a telephone switching system to provide an originating call restriction for a first telephone number at which said programmable control unit interfaces to said public switched telephone network so that telephone calls are accepted from a second telephone number corresponding to an interface of said front-end security gateway to said public switched telephone network and telephone calls from other telephone numbers are blocked;

initiating a telephone call for a dial-up connection from said front-end security gateway to said programmable control unit;

said telephone switching system recognizing said second telephone number as originating said telephone call; and said telephone switching system completing said telephone call to said programmable control unit.

8. A method for providing a gateway via a public communication network between a user computer system and a remotely-located programmable control unit operating with a physical plant, said method comprising the steps of:

establishing a protected communication channel between said user computer system and said gateway via a public data network;

authenticating and authorizing a user of said user computer system for accessing said programmable control unit; and establishing a dedicated communication path within said public network between said programmable control unit and said gateway using routing control for preventing devices other than said gateway from communicating with said programmable control unit, wherein said public communication network is comprised of a public switched telephone network;

relaying messages relating to supervisory functions of said physical plant between said user computer system and said programmable control unit through said gateway acting as a proxy;

wherein said routing control is comprised of:

configuring a telephone switching system to provide an originating call restriction for a first telephone number at which said programmable control unit interfaces to said public switched telephone network so that telephone calls are accepted from a second telephone number corresponding to an interface of said gateway to said public switched telephone network and telephone calls from other telephone numbers are blocked;

initiating a telephone call for a dial-up connection from said gateway to said programmable control unit;

said telephone switching system recognizing said second telephone number as originating said telephone call; and said telephone switching system completing said telephone call to said programmable control unit.

9. The method of claim 8 wherein said telephone switching system includes a service control point for determining telephone call dispositions in relation to said first telephone number.

10. The method of claim 8 wherein said telephone switching system includes a local office switch for determining telephone call dispositions in relation to said first telephone number.

11. The method of claim 8 wherein said public switched telephone network includes an operational support system for configuring said telephone switching system.

* * * * *